United States Patent [19]

Jaunarajs et al.

[11] 4,029,512

[45] * June 14, 1977

[54] METHOD FOR THE PREPARATION OF FIBROUS INSOLUBLE CALCIUM SULFATE ANHYDRITE

[75] Inventors: Karlis L. Jaunarajs, Denver, Colo.; Julie C. Yang, Lexington, Mass.

[73] Assignee: Johns-Manville Corporation, Denver, Colo.

[ * ] Notice: The portion of the term of this patent subsequent to Oct. 28, 1992, has been disclaimed.

[22] Filed: Aug. 5, 1974

[21] Appl. No.: 494,429

Related U.S. Application Data

[63] Continuation-in-part of Ser. No. 281,269, Aug. 16, 1972, abandoned.

[52] U.S. Cl. .................. 106/109; 106/99; 106/110; 106/111; 260/37 R; 260/40 R; 260/42.14; 260/42.17; 423/554; 423/555

[51] Int. Cl.$^2$ ........................ C04B 11/00

[58] Field of Search .......... 423/555, 554, 272, 270, 423/170, 171, 172; 106/99, 110, 111, 109; 260/37 R, 42.17, 42.14, 40 R

[56] References Cited

UNITED STATES PATENTS

| | | | |
|---|---|---|---|
| 757,649 | 4/1904 | Brothers | 106/110 |
| 1,708,436 | 4/1929 | Weinstein | 106/110 |
| 1,746,294 | 2/1930 | Tyler | 423/555 |
| 3,822,340 | 7/1974 | Eberl et al. | 423/555 |
| 3,915,927 | 10/1975 | Jaunarjs et al. | 106/306 |

FOREIGN PATENTS OR APPLICATIONS

| | | | |
|---|---|---|---|
| 563,019 | 7/1944 | United Kingdom | 423/172 |

OTHER PUBLICATIONS

"Process for Making High-Strength Plaster of Paris," James J. Eberl & Alvin R. Ingram, Industrial & Engineering Chemistry, vol. 41, No. 5, pp. 1061–1065.

Primary Examiner—Winston A. Douglas
Assistant Examiner—John P. Sheehan
Attorney, Agent, or Firm—Robert M. Krone; Joseph J. Kelly; James W. McClain

[57] ABSTRACT

A process is described for the formation of fibrous insoluble calcium sulfate anhydrite, the fibers thereof having specified dimensions. A dilute aqueous suspension of gypsum and, if desired, a crystal habit modifier suitable for the formation of fibrous calcium sulfate hemihydrate, is first formed. The gypsum in this suspension is then converted to the fibrous hemihydrate by reaction in the presence of saturated steam at 120° C to 155° C for 0.5 to 2.5 hours, thereby forming fibrous calcium sulfate hemihydrate of the desired dimensions. The fibrous hemihydrate is thereafter calcined at 500° C to 750° C for 0.5 to 3.0 hours to convert the fibrous hemihydrate to fibrous insoluble calcium sulfate anhydrite having substantially the same crystalline shape and dimensions.

11 Claims, No Drawings ns. These fibers have been found to be quite useful for reinforcement of hydraulic cement matrices, as well as for reinforcement of organic polymeric matrices. The process comprises first forming an aqueous suspension of gypsum which is not greater than 0.30 molar in gypsum. The gypsum used is ground or otherwise comminuted to a particulate form in which at least 90% of the articles are minus 4 mesh in size. The suspension may also contain a crystal habit modifier which is suitable for formation of the fibrous hemihydrate. Following formation of the suspension, the gypsum in the suspension is converted to the fibrous hemihydrate by reaction in a pressure vessel in the presence of saturated steam at a temperature in the range of from 120° C to 155° C for a period of 0.5 to 2.5 hours, thereby forming fibers of calcium sulfate hemihydrate having an average overall length in the range of from 30 to 70 microns, individual maximum lengths not exceeding 180 microns, the aspect ratios in the range of from 10:1 to 100:1. The fibrous hemihydrate is then calcined at a temperature in the range of from 500° C to 750° C for a period of 0.5 to 3.0 hours to convert the hemihydrate fibers to insoluble anhydrite fibers having essentially the same dimensions and shape.

METHOD FOR THE PREPARATION OF FIBROUS INSOLUBLE CALCIUM SULFATE ANHYDRITE

CROSS REFERENCE TO RELATED APPLICATION

This application is a continuation-in-part of application Ser. No. 281,269 filed Aug. 16, 1972, and now abandoned.

BACKGROUND OF THE INVENTION

1. Field of the Invention

The invention herein relates to the formation of fibrous insoluble calcium sulfate anhydrite.

Research has been carried on for years on the conversion of gypsum ($CaSO_4 \cdot 2H_2O$) into the various forms of its hemihydrate ($CaSO_4 \cdot \frac{1}{2}H_2O$), sometimes referred to as plaster of Paris, and its anhydrite ($CaSO_4$). The anhydrite occurs in two principal forms, referred to as "soluble" and "insoluble", according to their respective solubilities in water at approximately ambient temperature. The hemihydrate and both the soluble and insoluble anhydrites can each be produced in a fibrous crystalline form as well as in nonfibrous crystalline forms. The fibrous materials have been found useful as reinforcement in a variety of solid matrix materials, such as polymeric resins. Due to the high solubility of both the hemihydrate and the soluble anhydrite, however, the use of these fibrous materials as reinforcements has been limited to matrix materials which do not involve the use of water in their formation. Where water is present, these fibers dissolve readily and thus loose their fibrous structure which is critical to their use as reinforcements. The hemihydrate and soluble anhydrite fibers may therefore be use as reinforcement in matrices such as polymeric resins but cannot, for instance, be used as reinforcement in hydraulic cement products.

Since in many cases, such as construction applications, a hydraulic cement matrix is indispensable, it would be advantageous to provide a process for producing insoluble anhydrite fibers to the virtual exclusion of fibers of hemihydrate or soluble anhydrite and/or nonfibrous crystals.

2. Description of the Prior Art

There is a wide variety of patents and articles discussing various aspects of insoluble anhydrite formation from gypsum. Typical descriptive articles which describe insoluble anhydrite and its properties are those by Riddell in the May 1950 issue of *Rock Products*, page 68, and by Bauer in the April 1952 issue of *Pit and Quarry*, page 113. The book *The Chemistry of Cement and Concrete* by Lea describes gypsum properties on page 18. Various aspects of the formation of insoluble anhydrite by calcination of hemihydrate at high temperature are disclosed in U.S. Pat. Nos. 1,941,188; 1,989,712; 2,448,218; 2,460,267; 3,579,300; and 3,580,703. Insoluble anhydrite crystalline forms are described in U.S. Pat. No. 2,616,789. Formation of fibrous hemihydrate from high concentration suspensions is described in an article by Eberl et al in the May 1949 issue of *Industrial and Engineering Chemistry*, page 1061. Crystal habit modifiers are described in U.S. Pat. No. 2,907,668 and 3,520,708.

BRIEF SUMMARY OF THE INVENTION

The invention herein is a novel and specific process for the formation of fibrous insoluble calcium sulfate anhydrite with the fiber thereof having specified di-

DETAILED DESCRIPTION AND PREFERRED EMBODIMENTS

The invention herein is a process for the formation of fibrous insoluble calcium sulfate anhydrite. The invention also encompasses organic and inorganic materials reinforced with fibers of the fibrous insoluble calcium sulfate anhydrite. By the process of this invention, fibrous insoluble anhydrite may be produced to the virtual exclusion of non-fibrous materials, fibrous hemihydrate and/or fibrous soluble calcium sulfate anhydrite. The fibers produced by the process of this invention serve as excellent reinforcing agents for organic or inorganic matrices.

The process of this invention is a process for the formation of fibrous insoluble calcium sulfate anhydrite, the fibers thereof having an overall average length in the range of from 30 to 70 microns, individual maximum lengths not exceeding 180 microns, and aspect ratios in the range of from 10:1 to 100:1; which comprises: forming an aqueous suspension of gypsum, said suspension being not greater than 0.30M in gypsum, and said gypsum prior to dispersion being in the form of particles at least 90% of which are minus 4 mesh in size; and converting the gypsum in said suspension to said fibrous calcium sulfate hemihydrate by reaction in a pressure vessel in the presence of saturated steam at a temperature in the range of from 120° C to 155° C for a period of 0.5 to 2.5 hours, thereby forming fibers of calcium sulfate hemihydrate having an overall average length in the range of from 30 to 70 microns, individual maximum lengths generally not exceeding 180 microns, and aspect ratios in the range of from 10:1 to 100:1; thereafter calcining said fibers of calcium sulfate hemihydrate at a temperature in the range of 500° C to 750° C for a period of 0.5 to 3.0 hours to convert said fibers of calcium sulfate hemihydrate to fibers of insoluble calcium sulfate anhydrite having substantially the same crystalline shape and dimensions.

In the process herein, a specified form of fibrous insoluble calcium silicate anhydrite is formed from gypsum. The process is carried out in a conventional pressure vessel (such as an autoclave) which is preferably equipped with means for stirring the aqueous suspension of gypsum. The pressure vessel is also equipped with means for supplying saturated steam to the autoclave in order to maintain the proper temperature and pressure within the vessel.

In the pressure vessel, the temperature during the reaction period is maintained in the range of 120° C to 155° C, preferably in the range of 125° C to 140° C. Since this temperature represents the temperature of saturated steam, there will be associated the pressure of the saturated steam at the given temperature. Consequently, the attendant steam pressure will be approximately 29 to 79 psia, preferably about 33 to 52 psia.

The basic raw material used in the process of this invention is gypsum, calcium sulfate dihydrate. The gypsum used herein may be pure or substantially pure gypsum or it may be a commercial grade containing a small amount of impurities (such as calcite) which do not significantly affect the formation of the fibrous hemihydrate. Best results are obtained when the gypsum is ground, crushed, or otherwise comminuted to a particulate form in which at least 90% of the particles are of minus 4 mesh in size. Preferably approximately 80% of the particles will be minus 60 mesh in size. The comminuted gypsum is then dispersed in water to form an aqueous slurry which has a concentration not greater than 0.30M in gypsum and preferably not greater than 0.26M. At greater concentrations, the slurry has been found to be too thick to produce a uniform degree of formation of the fibrous hemihydrate. For instance, suspensions of 0.35M and 1.17M in gypsum have been found to yield reaction products containing significant amounts of non-fibrous hemihydrate in the first step of the present process; this results in an unsatisfactory yield of fibrous insoluble anhydrite in the subsequent step of the process.

The suspension may also contain a small amount of a crystal habit modifier which is suitable for the formation of the fibrous hemihydrate. While the prior art lists numerous crystal habit modifiers, it will be found that most of these act to discourage the formation of fibrous hemihydrate and to encourage the formation of broad crystals of hemihydrate. Such materials are to be avoided. There are, however, a number of materials which act to encourage the formation of the fibrous materials. These are generally acids such as boric, succinic, adipic, malonic, sebacic, and similar acids or their salts, as well as salts such as sodium chloride, sodium sulfate, aluminum sulfate, and zinc sulfate. Preferred among these is boric acid. The crystal habit modifier will be present in an amount of from 0.1 to 5 weight percent, preferably 0.25 to 1.5 percent.

As noted above, the pressure vessel in which the reaction is carried out should be equipped with means for stirring or otherwise mildly agitating the gypsum slurry during the reaction. Such stirring may be continuous or intermittent throughout the reaction period.

Reaction time will be in the range of 0.5 to 2.5 hours, preferably 0.75 to 2 hours. Reaction times will be inversely related to the temperature in most cases, with longer reaction times necessary for complete conversion to the fibrous hemihydrate at the lower reaction temperatures. When the reaction continues for periods longer than 2.5 hours, the hemihydrate tends to further dehydrate to soluble anhydrite.

Following completion of the formation of the fibrous hemihydrate the pressure and temperature in the pressure vessel are reduced and the fiber-containing slurry is removed from the pressure vessel and filtered. Thereafter the product is calcined at a temperature of from 500° C to 750° C, preferably 550° C to 650° C, for a period of 0.5 to 3.0 hours preferably 0.75 to 2 hours. The calcination may be carried out in any conventional calcining equipment.

The following examples will illustrate the process of this invention.

EXAMPLE 1

A commercial gypsum containing a minimum calcium sulfate content of 64.5% and being in particulate form in which 98% of the particles were minus 20 mesh in size, was dispersed in water to form a 0.23M suspension. The suspension also contained 1.0 weight percent of boric acid. This slurry was reacted for 100 minutes at an average temperature of about 145° C in a one gallon capacity stainless steel autoclave equipped with a stirrer; the stirrer was continuously rotated at 300 rpm for the full reaction period. The product obtained was essentially all fibrous hemihydrate. Fiber lengths were in the range of 10 to 100 microns with an average length of 40 microns. The fibrous hemihydrate was thereafter calcined at 600° C for one hour. The calcined product was essentially all fibrous insoluble anhydrite. Examination under the microscope showed that the insoluble anhydrite fibers were substantially unchanged in shape or dimension from the hemihydrate fibers.

EXAMPLE 2

The experiment of Example 1 was repeated under the same reaction conditions. The product obtained was essentially all fibrous hemihydrate. Fiber lengths were in the range of 10 to 80 microns with an average length of 30 microns. The fibrous hemihydrate was thereafter calcined at 600° C for one hour. The calcined product was essentially all fibrous insoluble anhydrite. Examination under the microscope showed that the insoluble anhydrite fibers were substantially unchanged in shape or dimensions from the hemihydrate fibers.

EXAMPLE 3

The experiment of Example 1 was repeated using an average temperature of about 132.5° C over a reaction period of 90 minutes. The resulting product was essentially all fibrous hemihydrate; fiber lengths were in the range of 10 to 90 microns, with an average length of 40 microns. The fibrous hemihydrate was thereafter calcined at 600° C for one hour. The calcined product was essentially all fibrous insoluble anhydrite. Examination under the microscope showed that the insoluble anhydrite fibers were substantially unchanged in shape or dimension from the hemihydrate fibers.

The invention herein also contemplates the incorporation of the fibrous hemihydrate into organic and/or inorganic matrices. A wide variety of organic materials, principally polymeric resins, are suitable as matrices which can be reinforced by the fibrous hemihydrate. These include polyesters, polyolefins such as polyethylene and polypropylene, poly(vinyl halides) such as poly(vinyl chloride), and polystryrene. The weight ratio of polymeric resin to fibrous hemihydrate will be in the range of from about 2:1 to about 12:1, preferably 2:1 to 6:1. If desired, the organic (polymeric) matrix can be extended by addition of up to about 50% of filler. Also included may be small amounts of conventional stabilizers, antioxidants, pigments, etc., used in such polymeric matrices. Inorganic matrices which may be reinforced by the insoluble anhydrite fibers include Portland cement and other hydraulic cements. The weight ratio of the inorganic matrix to the fibrous insoluble anhydrite will be in the range of from about 2:1 to about 7:1, preferably 2:1 to 5:1. If desired, the inorganic matrix may be extended by the addition of up to about 50% of filler, such as silica.

The following examples will illustrate the reinforced products of this invention.

EXAMPLE 4

A 200 gram premix containing 14% of the fibrous insoluble anhydrite produced in Example 3 above, 36% of a commercial polyester resin with a diethylaniline promoter and a benzolperoxide catalyst (as a 50% concentrate paste) added, and 50% of calcite filler was blended for 15 minutes. The mixture was heated for one minute at 250° F and then pressed under 40,000 psi for 5 minutes to form a sheet measuring 4 × 4½ × ⅛ inches. The composite material was found to have an impact strength of 0.38 ft-lb/in (notched) and 0.49 ft-lbs/in (unnotched), approximately comparable to a similar polyester reinforced with grade 7 chrysotile asbestos fiber.

EXAMPLE 5

In an alternative method of preparation 200 grams of the polyester resin of Example 4 were blended at 75° F with 20 grams of the anhydrite fiber produced in Example 2 above. No calcite filler was added. The mixture was then poured into molds of 8 × ¾ × ¼ inch in size and allowed to set in air for 1½ hours, followed by oven curing for one hour at 250° F. The material so prepared had a tensile strength of 3790 psi and a flexural strength of 7570 psi, both greater than a similar polyester reinforced with grade 7 chrysotile asbestos fiber.

EXAMPLE 6

An 85:15 weight ratio composite of polypropylene resin and the fibrous insoluble anhydrite prepared in Example 1 above was compounded at 400° F for about 5 minutes. The material was then cooled, remelted at 450° F and pressed under a 40,000 psi load for five minutes to form a sheet 100 mills thick. This reinforced material had a tensile strength modulus of rupture of 3590 psi and a flexural modulus of rupture of 6198 psi, both considerably greater than the comparable properties of a similar polypropylene composite reinforced with grade 7 chrysotile asbestos fiber.

EXAMPLE 7

A 150 gram dry blend containing 20% of the insoluble anhydrite fiber produced in Example 3 above, 30% of silica flour, and 50% of Portland cement was added to 1 liter of water, stirred for 10 minutes, filtered and then pressed at 25 psi for one minute into a 3 × 8 inch restrict mold. The sample was then moist air cured at 100% relative humidity and 20° C for 24 hours, and autoclaved for 16 hours in 100 psi saturated steam. The cured product had a flexural modulus of rupture of 1570 psi and a density of 124.8 lb/ft$^3$.

What we claim is:

1. A process for the formation of fibrous water insoluble calcium sulfate anhydrite, the fibers thereof having an overall average length in the range of from 30 to 70 microns, individual maximum lengths not exceeding 180 microns, and aspect ratios in the range of from 10:1 to 100:1; which comprises:
    a. forming an aqueous suspension of gypsum, said suspension being not greater than 0.30 molar in gypsum, and said gypsum prior to dispersion being in the form of particles at least 90% of which are minus 4 mesh in size; and
    b. converting the gypsum in said suspension to said fibrous calcium sulfate hemihydrate by reaction in a pressure vessel in the presence of saturated steam at a temperature in the range of from 120° C to 155° C for a period of 0.5 to 2.5 hours, thereby forming fibers of calcium sulfate hemihydrate having the aforesaid dimensions; and
    c. thereafter calcining said fibers of calcium sulfate hemihydrate at a temperature in the range of 500° C to 750° C for a period of 0.5 to 3.0 hours to convert said fibers of calcium sulfate hemihydrate to fibers of water insoluble calcium anhydrite having substantially the same crystalline shape and dimensions.

2. The process of claim 1 wherein said temperature of formation of the fibrous calcium sulfate hemihydrate is in the range of from 125° C to 140° C.

3. The process of claim 1 wherein said calcining is at a temperature of 550° C to 650° C.

4. The process of claim 1 wherein the reaction time in step (b) is a period of from 0.75 to 2.0 hours.

5. The process of claim 1 wherein said aqueous suspension also contains a crystal habit modifier suitable for formation of said fibrous hemihydrate and selected from the group consisting of boric, succinic, adipic, malonic and sebacic acids and salts thereof; sodium, aluminum and zinc sulfates and sodium chloride.

6. The process of claim 5 wherein said crystal habit modifier is present in a concentration of from 0.1 to 5 weight percent of said aqueous suspension.

7. The process of claim 6 wherein said crystal habit modifier is boric acid.

8. The process of claim 1 wherein said calcining in step (c) is for a period of from 0.75 to 2.0 hours.

9. The process of claim 1 wherein said aqueous suspension has a concentration not greater than 0.26 molar in gypsum.

10. A reinforced composite article comprising an inorganic matrix reinforced with the fibrous water insoluble calcium sulfate anhydrite produced in accordance with the process of claim 1.

11. A reinforced composite article comprising an organic polymeric resin matrix reinforced with the fibrous water insoluble calcium sulfate anhydrite produced in accordance with the process of claim 1.

* * * * *

UNITED STATES PATENT AND TRADEMARK OFFICE
CERTIFICATE OF CORRECTION

PATENT NO. : 4,029,512
DATED : June 14, 1977
INVENTOR(S) : Karlis L. Jaunarajs and Julie C. Yang It is certified that error appears in the above-identified patent and that said Letters Patent are hereby corrected as shown below:

Column 3, line 13, "290" should read --29--.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks